(12) United States Patent
Yoshida

(10) Patent No.: US 8,854,547 B2
(45) Date of Patent: Oct. 7, 2014

(54) VIDEO DISPLAY APPARATUS, SOURCE APPARATUS, VIDEO DISPLAY METHOD, AND VIDEO DISPLAY SYSTEM

(75) Inventor: Hitoshi Yoshida, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 13/215,006

(22) Filed: Aug. 22, 2011

(65) Prior Publication Data

US 2012/0133833 A1    May 31, 2012

(30) Foreign Application Priority Data

Nov. 30, 2010  (JP) ................................. 2010-267833

(51) Int. Cl.
- H04N 5/445       (2011.01)
- H04N 5/63        (2006.01)
- H04N 21/4363     (2011.01)
- H04N 21/443      (2011.01)

(52) U.S. Cl.
CPC ........... *H04N 5/63* (2013.01); *H04N 21/43635* (2013.01); *H04N 21/4436* (2013.01)
USPC ............ 348/563; 348/552; 348/730; 348/706

(58) Field of Classification Search
USPC ................. 348/730, 731, 553, 705, 706, 552; 345/211; 713/300; 725/74; 710/15–18
See application file for complete search history.

(56) References Cited

U.S. PATENT DOCUMENTS

| | | | |
|---|---|---|---|
| 8,345,165 B2 * | 1/2013 | Yamada et al. | 348/705 |
| 8,359,618 B2 * | 1/2013 | Komori | 725/80 |
| 2005/0125829 A1 | 6/2005 | Ozaki | |
| 2009/0102971 A1 * | 4/2009 | Chang et al. | 348/554 |
| 2009/0320055 A1 * | 12/2009 | Langille et al. | 725/14 |
| 2009/0322944 A1 | 12/2009 | Kitamori et al. | |
| 2010/0033026 A1 * | 2/2010 | Goto et al. | 307/126 |
| 2010/0070783 A1 * | 3/2010 | Okamoto et al. | 713/310 |
| 2010/0103272 A1 * | 4/2010 | Yagi | 348/192 |
| 2010/0131782 A1 * | 5/2010 | Higuchi | 713/310 |
| 2011/0047394 A1 * | 2/2011 | Sato | 713/310 |
| 2011/0164181 A1 * | 7/2011 | Higuchi et al. | 348/552 |
| 2011/0176056 A1 * | 7/2011 | Toba | 348/552 |

FOREIGN PATENT DOCUMENTS

| | | |
|---|---|---|
| JP | 07-322169 | 12/1995 |
| JP | 2004-186772 | 7/2004 |
| JP | 2004-235920 | 8/2004 |
| JP | 2005-167774 | 6/2005 |

(Continued)

OTHER PUBLICATIONS

Japanese Patent Application No. 2010-267833, Notification of Reasons for Refusal, mailed Nov. 29, 2011, (with English Translation).

(Continued)

*Primary Examiner* — Jefferey Harold
*Assistant Examiner* — Humam Satti
(74) *Attorney, Agent, or Firm* — Blakely, Sokoloff, Taylor & Zafman LLP

(57) ABSTRACT

According to one embodiment, there is provided a video display apparatus, including: a video display unit configured to display a video by receiving a video signal output from a source apparatus; a status information acquisition module configured to acquire, from the source apparatus, status information indicating whether the source apparatus is active or inactive; and a power controller configured to perform a control of powering off the video display apparatus if the acquired status information indicates that the source apparatus is inactive.

3 Claims, 9 Drawing Sheets

(56) References Cited

FOREIGN PATENT DOCUMENTS

| JP | 2005-250529 | 9/2005 |
| JP | 2006-310922 | 11/2006 |
| JP | 2007-293776 | 11/2007 |
| JP | 2008-182524 | 8/2008 |
| JP | 2009-016897 | 1/2009 |
| JP | 2009-253430 | 10/2009 |
| JP | 2010-010855 | 1/2010 |
| JP | 2010-087823 | 4/2010 |

OTHER PUBLICATIONS

Japanese Patent Application No. 2010-267833, Notification of Reasons for Refusal, mailed Mar. 21, 2012, (with English Translation).

* cited by examiner

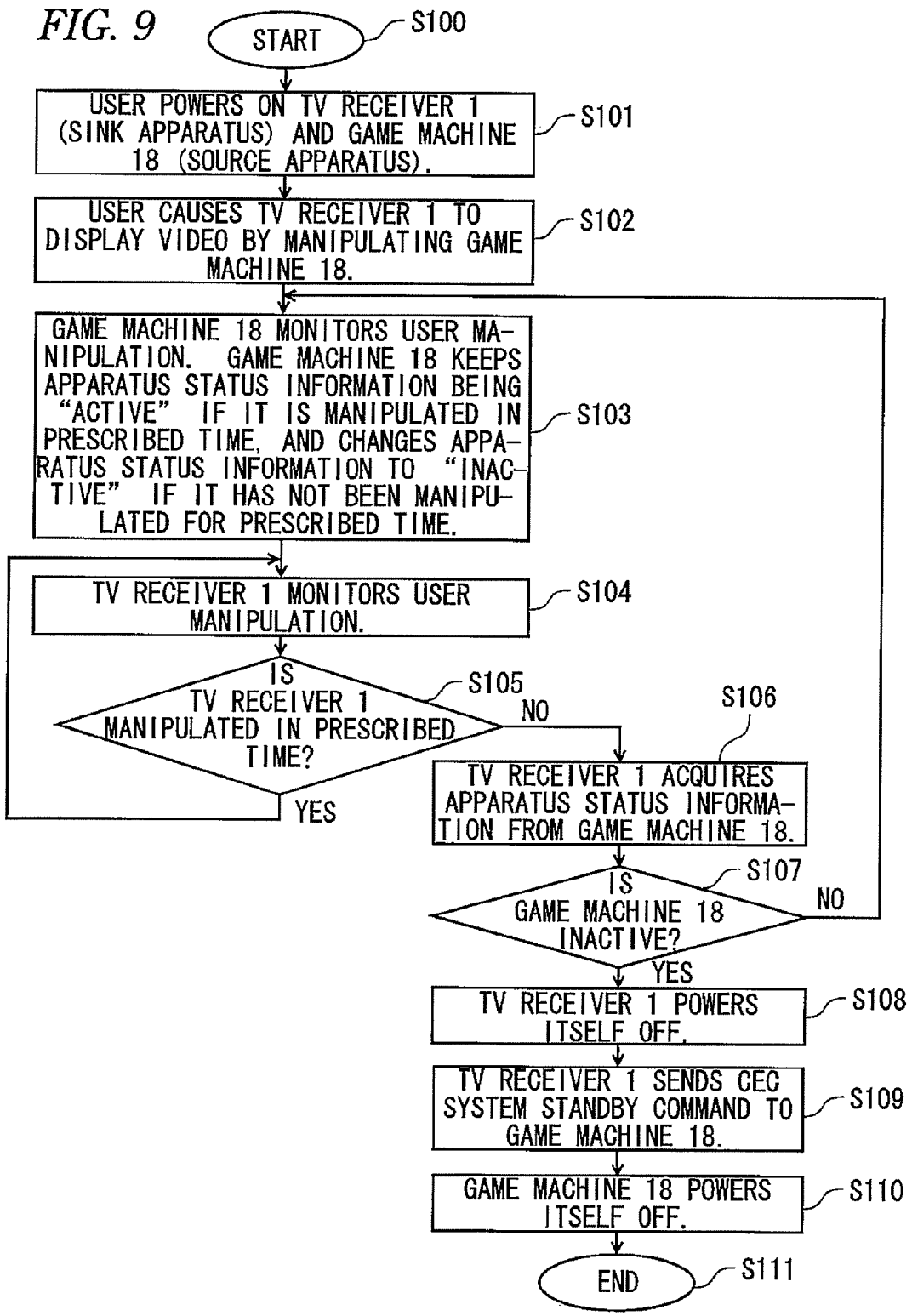

VIDEO DISPLAY APPARATUS, SOURCE APPARATUS, VIDEO DISPLAY METHOD, AND VIDEO DISPLAY SYSTEM

CROSS-REFERENCE TO RELATED APPLICATION(S)

This application is based upon and claims the benefit of priority from Japanese Patent Application No. 2010-267833, filed on Nov. 30, 2010, the entire contents of which are incorporated herein by reference.

FIELD

Embodiments described herein relate generally to a video display apparatus which receives and displays a video signal, a source apparatus, a video display method, and a video display system.

BACKGROUND

Nowadays, users enjoy games by connecting a source apparatus such as a game machine to, for example, an external input terminal of a video display apparatus (sink apparatus) such as a TV receiver and displaying, on the video display apparatus, a video signal that is output from the source apparatus.

On the other hand, at present, in video display apparatus such as TV receivers, power saving is an issue to attend to. For example, there are video display apparatus having a function of powering themselves off if they have not been manipulated by a user for a prescribed time.

However, for example, the following event may occur. A video display apparatus powers itself off when a prescribed time has elapsed because it does not recognize that a game machine is being manipulated, though a user is manipulating the game machine using a game controller or the like and the game machine is outputting a video signal. This is inconvenient to users, which is a problem.

Video display apparatus (sink apparatus) having a power saving function may power themselves off though a user is manipulating a source apparatus. This is inconvenient to users.

BRIEF DESCRIPTION OF DRAWINGS

A general architecture that implements the various feature of the present invention will now be described with reference to the drawings. The drawings and the associated descriptions are provided to illustrate embodiments and not to limit the scope of the present invention.

FIG. 9 illustrates a process which is executed by each of the video display apparatus according to the embodiments.

DETAILED DESCRIPTION

In general, according to one embodiment, there is provided a video display apparatus, including: a video display unit configured to display a video by receiving a video signal output from a source apparatus; a status information acquisition module configured to acquire, from the source apparatus, status information indicating whether the source apparatus is active or inactive; and a power controller configured to perform a control of powering off the video display apparatus if the acquired status information indicates that the source apparatus is inactive.

Embodiments will be hereinafter described with reference to the drawings.

Figure 1:
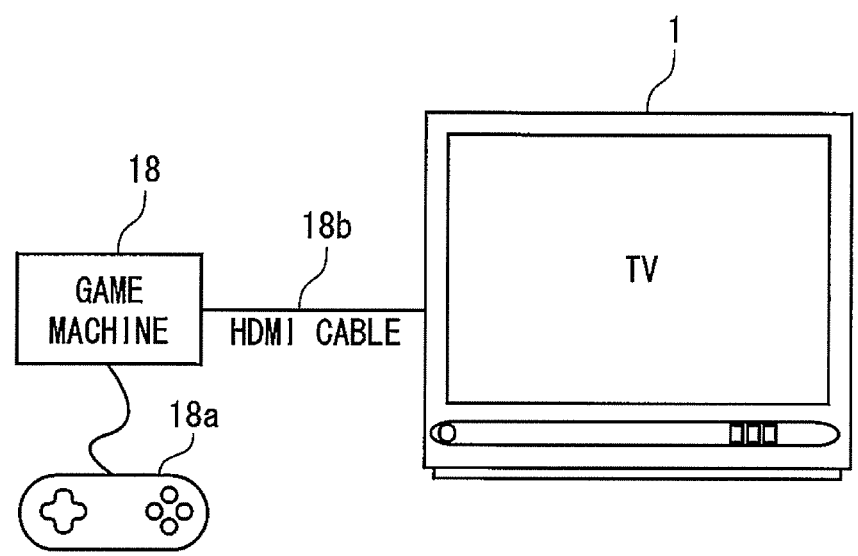
FIG. 1 shows a video display system in which a game machine (source apparatus) is connected to a video display apparatus (sink apparatus) according to an embodiment.

FIG. 1 shows a video display system in which a source apparatus is connected to a video display apparatus according to an embodiment. Reference numeral 1 denotes a video display apparatus which is the sink apparatus. Although the embodiment is directed to the case that the video display apparatus is a TV receiver, it may be any apparatus capable of displaying video such as a PC or a portable terminal. Reference numeral 18 denotes a game machine which is the source apparatus, and reference symbol 18a denotes a game controller for controlling the game machine 18.

Reference symbol 18b denotes an HDMI (high-definition multimedia interface; registered trademark) cable. In the embodiment, the video display apparatus (TV receiver) 1 and the game machine 18 comply with the HDMI standard and are connected to each other by the HDMI cable 18b.

In the embodiment, the user manipulates the game machine 18 and a video signal relating to a game, for example, is output to the video display apparatus (TV receiver) 1 via the HDMI cable 18b.

As described above, there is a relationship that the game machine 18 is a source and the video display apparatus (TV receiver) 1 is a sink apparatus.

Figure 2:
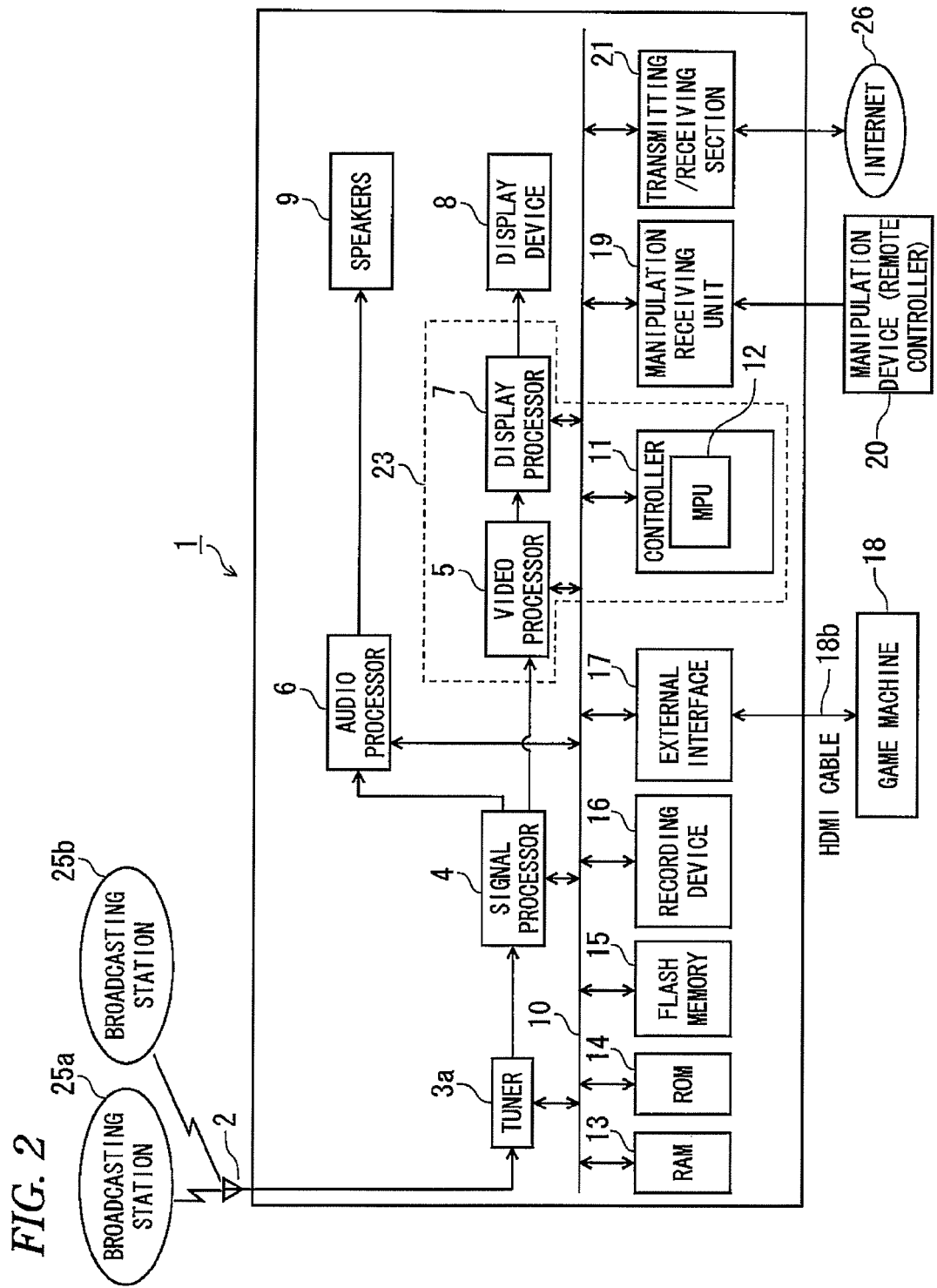
FIG. 2 illustrates a system configuration of the video display apparatus according to the embodiment.

FIG. 2 illustrates a system configuration of the video display apparatus 1 according to the embodiment. Reference numeral 2 denotes an antenna; 3a, a tuner; 4, a signal processor; 5, a video processor; 6, an audio processor; 7, a display processor; 8, a display device; 9, speakers; and 10, a bus.

Reference numeral 11 denotes a controller; 12, an MPU; 13, a RAM; 14, a ROM; 15, a flash memory; and 16, a recording device.

Reference numeral 17 denotes an external interface; 19, a manipulation receiving unit; and 20, a manipulation device (remote controller). Reference numeral 21 denotes a transmitting/receiving section and reference numeral 26 denotes the Internet.

Broadcast programs are broadcast from plural broadcasting stations such as broadcasting stations 25a and 25b. An antenna 2 is connected to the video display apparatus (TV receiver) 1. A single tuner or plural tuners 3a are provided. Broadcast signals of plural programs that are broadcast from the broadcasting stations 25a and 25b etc. in the form of broadcast waves are received by the antenna 2 and supplied to the tuner 3a. The tuner 3a tunes in to a broadcast signal of a program and outputs the thus-selected broadcast signal to the signal processor 4.

In the embodiment, the MPU 12 of the controller 11 is connected to the tuner 3a, the signal processor 4, the video processor 5, the audio processor 6, the display processor 7, the RAM 13, the ROM 14, the flash memory 15, the recording device 16, the external interface 17, the manipulation receiving unit 19, the manipulation device (remote controller) 20, and the transmitting/receiving section 21 via the bus 10 and controls them.

The signal processor 4 performs decoding processing on a broadcast signal of a program selected by the tuner 3a, and outputs a resulting broadcast signal having the transport stream (TS) format to the recording device 16.

The recording device 16 is a large-capacity recording device (video signal recording device) such as an HDD (hard disk drive). In the embodiment, the recording device 16 is provided inside the video display apparatus (TV receiver) 1. The recording device 16 may be an SSD.

The recording device 16 continuously receives a broadcast signal of a broadcast program having the transport stream format and records it. Broadcast programs recorded in the recording device 16 can be reproduced when necessary. A broadcast signal of a program that is extracted from recorded broadcast programs is decoded by the signal processor 4. An audio signal and a video signal are extracted from a decoded signal and output to the audio processor 6 and the video processor 5, respectively.

The audio processor 6 decodes the received audio signal and outputs resulting signals to the speakers 9. The speakers 9 convert the received audio signals into an output sound.

The video processor 5 decodes the received video signal and outputs a resulting signal to the display processor 7. The display processor 7 performs display processing relating to colors, display positions, etc. and outputs a resulting video signal to the display device 8. The display device 8 displays the received video signal on a display unit such as a display panel (not shown).

In the embodiment, the video display apparatus (TV receiver) 1 (actually, external interface 17) is connected to the game machine 18 via the HDMI cable 18b. The manipulation device 20 such as a remote controller or a keyboard is connected to the video display apparatus 1 (actually, manipulation receiving unit 19), whereby the user can manipulate the video display apparatus 1. The video display apparatus 1 (actually, transmission/receiving section 21) is connected to the Internet and hence can perform an Internet communication.

Figure 3:
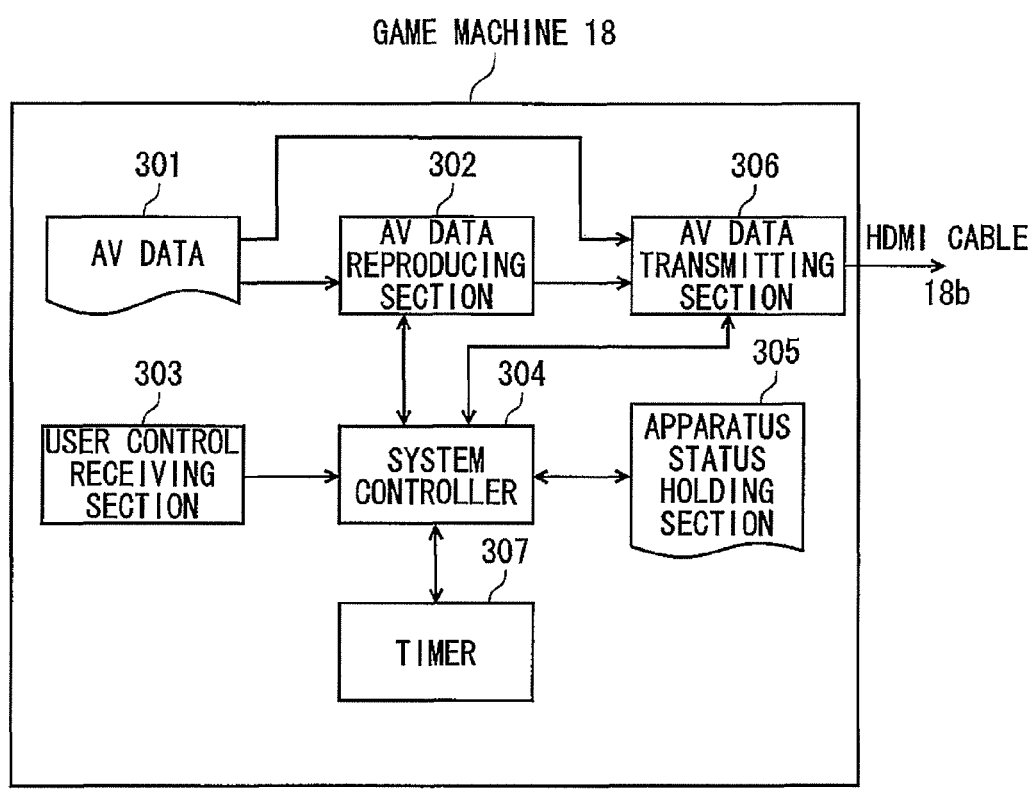
FIG. 3 illustrates a functional configuration of the game machine which is connected to the video display apparatus according to the embodiment.

FIG. 3 illustrates a functional configuration of the game machine 18 which is connected to the video display apparatus 1 according to the embodiment. As mentioned above, the game machine 18 is a source apparatus for the video display apparatus (TV receiver) 1. In the embodiment, as shown in FIG. 3, the game machine 18 (source apparatus) outputs a video signal (AV data), for example, to the video display apparatus 1 (sink apparatus) via the HDMI cable 18b.

For example, AV data is recording in a storage medium such as an HDD or a DVD (digital versatile disc), VOD (video on demand) data transmitted by ground-wave digital broadcast or via a network line, or transport stream data as typified by data of IPTV. In the embodiment, AV data of any type can be used.

A system controller 304 controls an AV data reproducing section 302 and an AV data transmitting section 306. The system controller 304 checks a format of AV data 301. If decoding is necessary, the system controller 304 supplies the AV data 301 to the AV data reproducing section 302. The AV data reproducing section 302 decodes the AV data and outputs resulting data to the AV data transmitting section 306. If decoding is not necessary, the system controller 304 supplies the AV data 301 to the AV data transmitting section 306.

A user control receiving section 303 receives a command that is output from the game controller 18a or a remote controller (not shown) manipulated by the user. The received command is input to the system controller 304. The system controller 304 a system control for the game machine 18 according to the received command.

In the embodiment, when the game machine 18 has received a user manipulation such as a user control command, the system controller 304 makes the apparatus status information of the game machine 18 "active" and causes an apparatus status holding section 305 to hold that information.

In the embodiment, the game machine 18 is equipped with a timer 307, which keeps time. If no user manipulation (e.g., control command) has not been made for a prescribed time (e.g., 10 minutes), the system controller 304 changes the apparatus status information from "active" to "inactive" and causes an apparatus status holding section 305 to hold the latter information.

As described later, when receiving, from the video display apparatus 1 (sink apparatus), a request for sending the apparatus status information ("active" or "inactive") held by the apparatus status holding section 305, the game machine (actually, AV data transmitting section 306) sends the apparatus status information to the video display apparatus (TV receiver) 1.

That is, the AV data transmitting section 306 outputs AV data including video and audio and apparatus status information of the game machine 18 to the HDMI cable 18b.

Although in the embodiment the AV data transmission line is the HDMI cable 18b, AV data may be transmitted by radio or the like.

Figure 4:
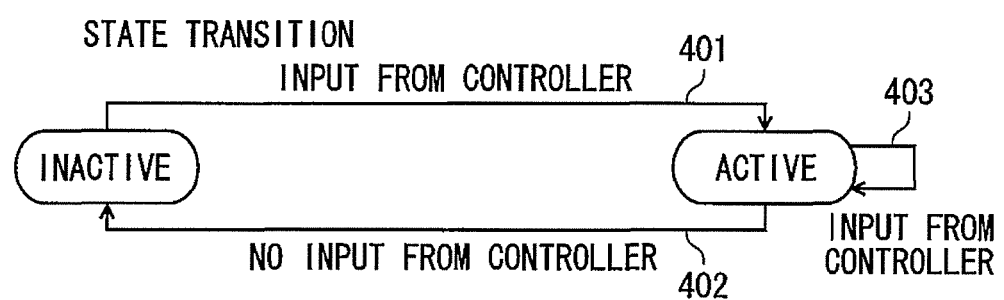
FIG. 4 illustrates how a transition of apparatus status information is caused in the game machine (source apparatus) which is connected to the video display apparatus according to the embodiment, in each of a case that the game machine itself has been manipulated and a case that it has not been manipulated.

FIG. 4 illustrates how the status is held in the game machine 18 (source apparatus) which is connected to the video display apparatus (TV receiver) 1, in each of a case that the game machine 18 itself has been manipulated and a case that it has not been manipulated.

How the apparatus status information which is held by the apparatus status holding section 305 makes a transition will be described below. In the HDMI standard, a transition of device status information can be caused by a CEC (consumer electronics control) message.

When receiving a message from, for example, the game controller 18a in a state that the apparatus status information is "inactive," the game machine 18 causes a transition of the apparatus status information to "active" (indicated by numeral 401) and holds that information. When receiving a message in a state that the apparatus status information is "active," the game machine 18 keeps the apparatus status information being "active" (indicated by numeral 403).

If the timer 307 shows that no message has been input from the game controller 18a for a prescribed time (e.g., 30 minutes), the game machine 18 causes a transition of the apparatus status information to "inactive."

Figure 5:
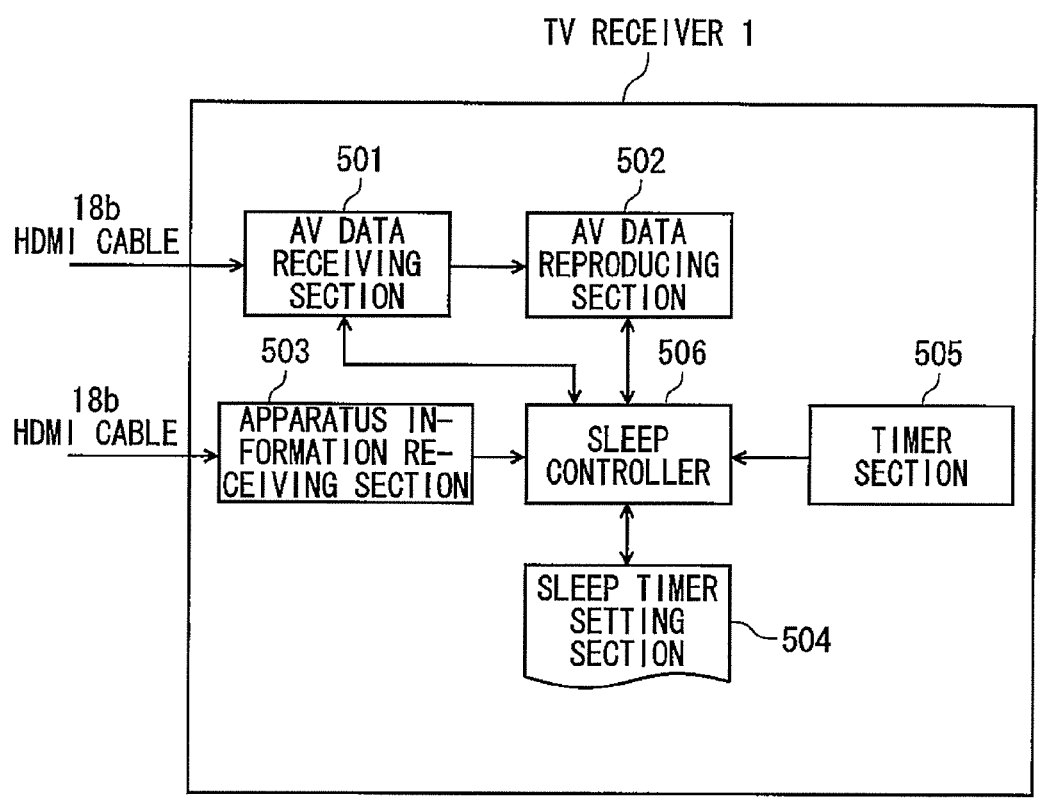
FIG. 5 illustrates a functional configuration of the video display apparatus according to the embodiment which is connected to the game machine.

FIG. 5 illustrates a functional configuration of the video display apparatus (TV receiver) 1. In the embodiment, the video display apparatus (TV receiver) 1 is a sink apparatus which is connected to the game machine 18 (source apparatus).

As described above, AV data including video and/or audio and apparatus status information of the game machine 18 are output from the game machine 18 via the HDMI cable 18b.

An AV data receiving section 501 receives the AV data including video and/or audio which is output from the game machine 18. An AV data reproducing section 502 reproduces the AV data supplied from the AV data receiving section 501. A sleep controller 506 is connected to the AV data receiving section 501 and the AV data reproducing section 502 and controls them.

An apparatus information receiving section 503 receives the apparatus status information ("active" or "inactive"; managed in the game machine 18) from the game machine 18, and supplies it to the sleep controller 506.

Using the received apparatus status information, the sleep controller 506 judges whether to put the video display apparatus 1 (sink apparatus) into a sleep state from an active state.

A sleep timer setting section 504 holds set time information upon expiry of which a judgment as to whether to put the video display apparatus (TV receiver) 1 into a sleep state is made.

A timer section 505 keeps time when instructed to do so by the sleep controller 506. Using the timer section 505, the sleep controller 506 measures a time for which the video display apparatus (TV receiver) 1 has not been manipulated by the user.

The sleep controller 506 compares the time for which the video display apparatus (TV receiver) 1 has not been manipulated by the user with a prescribed time (e.g., 30 minutes) that is set in the sleep timer setting section 504. If the time for which the video display apparatus (TV receiver) 1 has not been manipulated by the user is longer than the prescribed time (e.g., 30 minutes) that is set in the sleep timer setting section 504, the sleep controller 506 judges whether to put the video display apparatus (TV receiver) 1 into a sleep state from an active state using the apparatus status information received by the apparatus information receiving section 503 which indicates whether the game machine 18 is active or inactive.

The system controller 304 performs the following power control for the video display apparatus (TV receiver) 1. If judging that the game machine 18 is active, the sleep controller 506 keeps the video display apparatus (TV receiver) 1 active. If judging that the game machine 18 is inactive, the sleep controller 506 puts the video display apparatus (TV receiver) 1 into a sleep state.

When the video display apparatus (TV receiver) 1 acquires apparatus information from the game machine 18 using the HDMI cable 18b, a request command (CEC command) is sent via the CEC lines of HDMI ports.

As described above, in judging whether to make a transition to a sleep state, the video display apparatus (TV receiver) 1 requests the game machine 18 to send apparatus status information. In response to this transmission request, the game machine 18 sends apparatus status information to the apparatus information receiving section 503 of the video display apparatus (TV receiver) 1.

The apparatus information receiving section 503 judges the content of the apparatus status information received from the game machine 18, and supplies a judgment result to the sleep controller 506. According to the judgment result, the system controller 304 performs a power control, that is, keeps the video display apparatus (TV receiver) 1 active or puts the video display apparatus (TV receiver) 1 into a sleep state.

Figure 6:
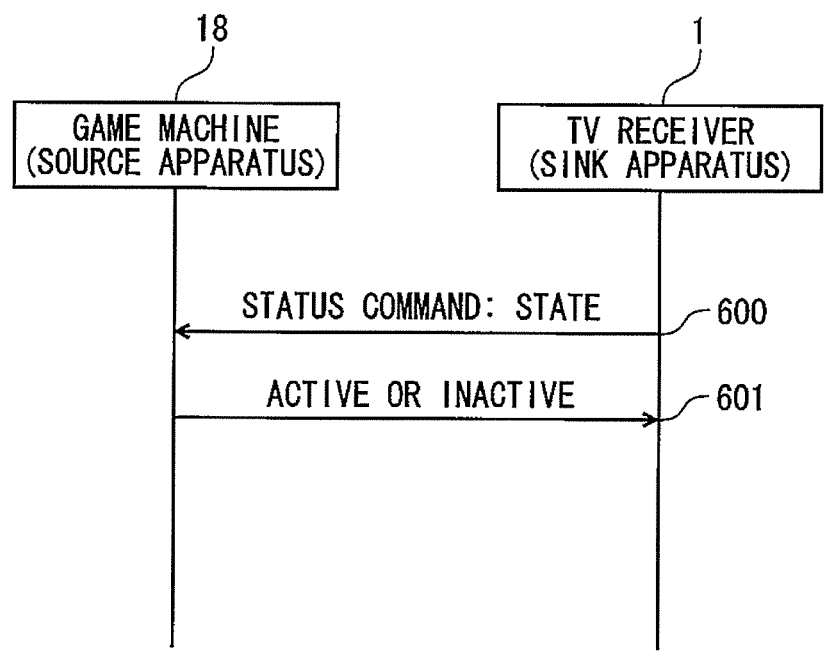
FIG. 6 illustrates how the video display apparatus according to the embodiment recognizes a status of the game machine connected to it using an HDMI-CEC command.

FIG. 6 illustrates how the video display apparatus (TV receiver) 1 according to the embodiment recognizes a status of the game machine 18 connected to it using an HDMI-CEC command.

In the embodiment, the video display apparatus (TV receiver) 1 and the game machine 18 are connected to each other by the HDMI cable 18b and the video display apparatus (TV receiver) 1 recognizes a status of the game machine 18 using an HDMI-CEC command.

As shown in FIG. 6, in the embodiment, to recognize a status of the game machine 18, that is, whether the game machine 18 is active or inactive, the video display apparatus (TV receiver) 1 sends a status command (HDMI-CEC command) to the game machine 18 (indicated by numeral 600).

Receiving the status command, the game machine 18 sends, to the video display apparatus (TV receiver) 1, the apparatus status information ("active" or "inactive") that is held by the apparatus status holding section 305 (indicated by numeral 601).

The video display apparatus (TV receiver) 1 can thus recognize the status (active or inactive) of the game machine 18.

Figure 7:
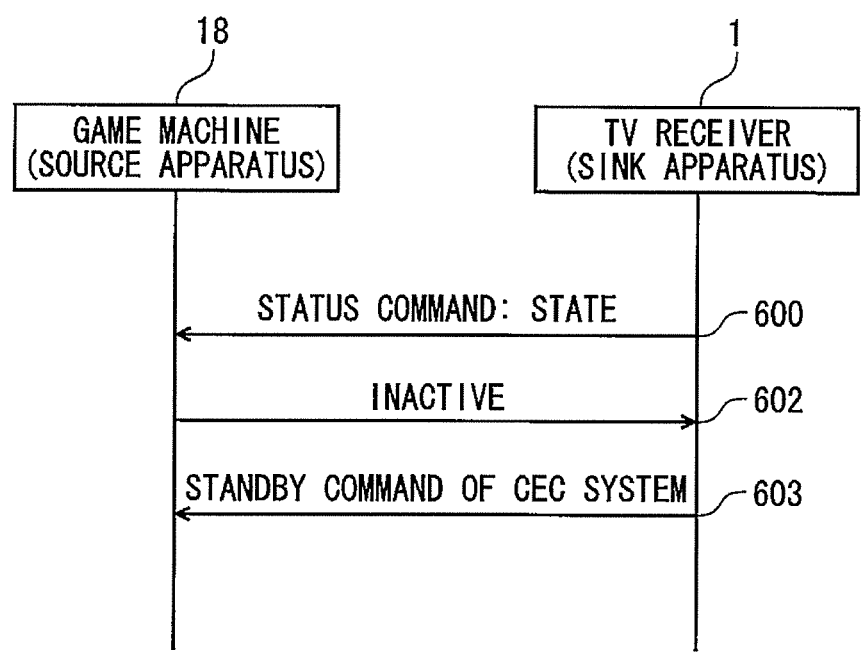
FIG. 7 illustrates how the video display apparatus according to the embodiment recognizes a status of the game machine connected to it using an HDMI-CEC command and, if judging that the game machine is inactive, the video display apparatus powers itself off.

FIG. 7 illustrates how the video display apparatus (TV receiver) 1 according to the embodiment recognizes a status of the game machine 18 connected to it using an HDMI-CEC command and, if judging that the game machine 18 is inactive, the video display apparatus 1 powers itself off.

As described above, to acquire apparatus status information of the game machine 18, the video display apparatus (TV receiver) 1 sends a status command (HDMI-CEC command) to the game machine 18 (indicated by numeral 600).

In this example, the game machine 18 sends, to the video display apparatus (TV receiver) 1, apparatus status information that is held in the game machine 18 and indicates that it is inactive and the video display apparatus (TV receiver) 1 receives the apparatus status information (indicated by numeral 602).

In response to the received apparatus status information, the video display apparatus (TV receiver) 1 sends an HDMI-CEC system standby command to the game machine 18 (indicated by numeral 603).

Receiving the HDMI-CEC system standby command, the game machine 18 performs a control of powering itself off (in link with the power-off of the video display apparatus (TV receiver) 1).

If receiving apparatus status information to the effect that the game machine 18 is active, it is preferable that, for example, the video display apparatus (TV receiver) 1 reset its sleep timer (sleep timer setting section 504).

Where the non-manipulation time to cause sleeping is set at 30 minutes, for example, the video display apparatus (TV receiver) 1 inquires of the game machine 18 about its status when the video display apparatus (TV receiver) 1 has not been manipulated for 30 minutes.

With the above configuration, resetting the sleep timer if the game machine 18 is active makes it possible to set the next judgment timing properly. The HDMI-CEC system standby command used in the embodiment will be described below.

HDMI-CEC is a function of enabling cooperation between apparatus through transmission of a control signal over an HDMI cable. Where control microcomputers of respective digital apparatus are connected to each other by single-wire serial CEC lines in daisy chain form, HDMI-CEC enables exchange of CEC commands.

The system standby is a function of powering off a peripheral device that is HDMI-connected to a TV receiver when a power-off manipulation is performed on the TV receiver.

The system standby allows a user who has enjoyed viewing of a TV receiver, a DVD player, or the like to power off, by one touch, plural apparatus that have been used.

Figure 8:
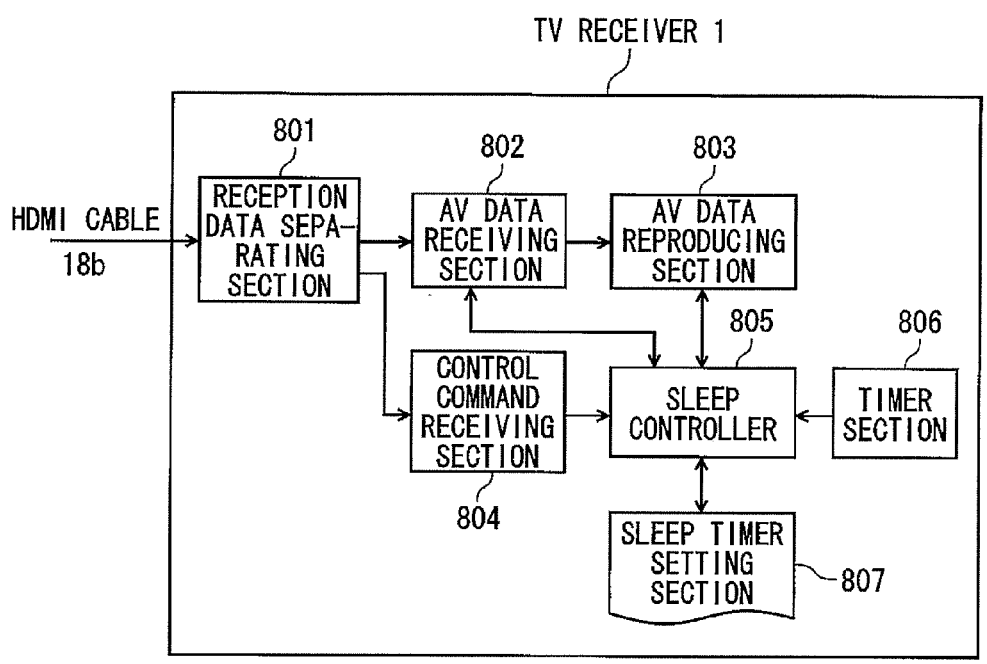
FIG. 8 illustrates a functional configuration of a video display apparatus according to another embodiment which is connected to a source apparatus.

FIG. 8 illustrates a functional configuration of a video display apparatus according to another embodiment which is connected to a source apparatus.

In this embodiment, as in the above embodiment, the video display apparatus (TV receiver) 1 is a sink apparatus which is connected to a source apparatus which is a game machine 18. AV data including video and/or audio and apparatus status information of the game machine 18 is sent from the game machine 18 via an HDMI cable 18*b*. The AV data transmission line may be a radio transmission line or the like.

In this embodiment, the video display apparatus (TV receiver) 1 is equipped with a reception data separating section 801 which receives AV data including apparatus status information of the game machine 18 from the game machine 18.

The data separating section 801 separates the received AV data into data including the video and/or audio and data including the apparatus status information of the game machine 18 and outputs those data.

The data including the video and/or audio is received by an AV data receiving section 802 and supplied to an AV data reproducing section 803. The AV data reproducing section 803 reproduces the AV data including the video and/or audio.

A sleep controller 805 is connected to the AV data receiving section 802 and the AV data reproducing section 803 and controls them.

A control command receiving section 804 receives the data including the apparatus status information of the game machine 18. As in the above embodiment, the control command receiving section 804 receives the apparatus status information that is managed in the game machine 18 and indicates whether the game machine 18 is active or inactive, and supplies it to the sleep controller 805.

Using the received apparatus status information, the sleep controller 805 judges whether to put the video display apparatus 1 (sink apparatus) into a sleep state from an active state.

As in the above embodiment, a sleep timer setting section 807 holds set time information upon expiry of which a judgment as to whether to put the video display apparatus (TV receiver) 1 into a sleep state is made.

A timer section 806 keeps time when instructed to do so by the sleep controller 805. Using the timer section 806, the sleep controller 805 measures a time for which the video display apparatus (TV receiver) 1 has not been manipulated by the user.

The sleep controller 805 compares the time for which the video display apparatus (TV receiver) 1 has not been manipulated by the user with a prescribed time (e.g., 30 minutes) that is set in the sleep timer setting section 807. If the time for which the video display apparatus (TV receiver) 1 has not been manipulated by the user is longer than the prescribed time (e.g., 30 minutes) that is set in the sleep timer setting section 807, the sleep controller 805 judges whether to put the video display apparatus (TV receiver) 1 into a sleep state from an active state using the apparatus status information indicating whether the game machine 18 is active or inactive.

The system controller 805 performs the following power control for the video display apparatus (TV receiver) 1. If judging that the game machine 18 is active, the sleep controller 805 keeps the video display apparatus (TV receiver) 1 active. If judging that the game machine 18 is inactive, the sleep controller 805 puts the video display apparatus (TV receiver) 1 into a sleep state.

As in the above embodiment, when the video display apparatus (TV receiver) 1 acquires apparatus information from the game machine 18 using the HDMI cable 18*b*, a request command (CEC command) is sent via the CEC lines of HDMI ports.

FIG. 9 illustrates a process which is executed by each of the video display apparatus 1 (sink apparatus; in the following, represented by the video display apparatus 1) according to the embodiments.

The process starts at step S100. At step S101, the user powers on the TV receiver 1 (sink apparatus) and the game machine 18 (source apparatus) which are connected to each other by the HDMI cable 18*b*.

At step S102, the user causes the TV receiver 1 to display video by manipulating the game machine 18. At step S103, the game machine 18 monitors a user manipulation, and keeps the apparatus status information being "active" if a user manipulation is made in a prescribed time and changes the apparatus status information to "inactive" if no user manipulation has not been made for the prescribed time. The apparatus status information is held by the apparatus status holding section 305 (memory) of the game machine 18.

At step S104, the TV receiver 1 monitors a user manipulation on itself. At step S105, the TV receiver 1 judges whether or not it has been manipulated in a prescribed time. If the TV receiver 1 judges that it has been manipulated in the prescribed time (S105: yes), the process returns to step S104. On the other hand, if TV receiver 1 judges that it has not been manipulated for the prescribed time (S105: no), the process moves to step S106.

At step S106, the TV receiver 1 acquires apparatus status information of the game machine 18 by requesting the game machine 18 to send it.

At step S107, the TV receiver 1 judges whether or not the game machine 18 is inactive. If it is judged that the game machine 18 is inactive (S107: yes), the process moves to step S108. If it is judged that the game machine 18 is active (S107: no), the process returns to step S103.

At step S108, the TV receiver 1 performs a control of powering itself off.

At step S109, in link with the power-off of itself, the TV receiver 1 sends a CEC system standby command to the game machine 18.

At step S110, receiving the CEC system standby command, the game machine 18 performs a control of powering itself off.

The process is finished at step S111.

With the above-described process, in each embodiment, the game machine 18 holds the apparatus status information indicating whether the game machine 18 is active because it has been controlled by the game controller or the like or the game machine 18 is inactive because it has not been controlled by the game controller or the like. The game machine 18 sends the apparatus status information to the TV receiver 1 when requested to do so.

For example, the TV receiver 1 measures a time for which it has not been manipulated by the user. If not manipulated for the prescribed time or more, the TV receiver 1 acquires apparatus status information from the game machine 18. Based on the acquired apparatus status information, the TV receiver 1 judges whether to power itself off.

If the TV receiver 1 is to perform a control of powering itself off, the TV receiver 1 controls the game machine 18 using, for example, an HDMI-CEC system standby command so that the game machine 18 powers itself off.

In each embodiment, if no user manipulation has been performed on the TV receiver 1 (sink apparatus), the TV receiver 1 performs a power control by judging a system status of the game machine 18 (source apparatus).

As a result, the TV receiver 1 does not stop its operation while the user is manipulating the game machine 18. This is more convenient to the user. As described above, power control is performed taking into consideration the connection state of the TV receiver 1 and the game machine 18, which enables power saving control.

In each embodiment, the TV receiver 1 checks a status of the game machine 18 using an HDMI CEC command. Alternatively, where both of the TV receiver 1 and the game machine 18 are connected to a network, a status of the game machine 18 may be checked according to another protocol such as IP (Internet protocol).

As described above, the video display apparatus (TV receiver) 1 which is a sink apparatus according to each embodiment is equipped with a video display unit which displays video by receiving a video signal from the game machine 18 which is a source apparatus.

The video display apparatus (TV receiver) 1 is also equipped with a status information acquisition module which acquires, from the game machine 18, status information indicating whether the game machine 18 is active or inactive.

The video display apparatus (TV receiver) 1 is also equipped with a power controller which performs a control of powering off the video display apparatus (TV receiver) 1 if the game machine 18 is inactive.

The game machine 18 which is a source apparatus according to each embodiment is equipped with a status information holding module which monitors whether or not the game machine 18 has been manipulated and which keeps status information being "active" if the game machine 18 is manipulated in a prescribed time and changes the status information to "inactive" if the game machine 18 has not been manipulated for the prescribed time.

The game machine 18 is also equipped with an output module which sends the status information held by the status information holding module to the video display apparatus (TV receiver) 1 when requested to do so.

With the above-described configuration, in the video display apparatus 1 (sink apparatus) according to each embodiment of the invention which has a power saving function, the problem that it may be powered off though the user is manipulating a source apparatus can be solved and the convenience of the user can thereby be increased.

The invention is not limited to the above embodiments themselves and, may be embodied while variously modifying components without departing from the spirit and scope of the invention.

The invention claimed is:

1. A video display system, comprising:
a source apparatus;
a video display apparatus; and
a cable connecting the source apparatus and the video display apparatus,
wherein the source apparatus comprising:
   a status information holding module configured to hold status information which is updated into active if the source apparatus is manipulated in a first prescribed time and which is updated into inactive if the source apparatus has not been manipulated for the first prescribed time, and
   an output module configured to send the status information which is currently held at the status information holding module to the video display apparatus upon receiving a request therefrom, and
wherein the video display apparatus comprising:
   a video display unit configured to display a video by receiving a video signal that is output from the source apparatus,
   a status information acquisition module configured to send the request toward the source apparatus if a prescribed condition is satisfied, and to receive the status information from the status information holding module of the source apparatus, wherein the prescribed condition is satisfied when the video display apparatus has not been manipulated for a second prescribed time, and
   a power controller configured to power off the video display apparatus if the prescribed condition is satisfied and the received status information indicates inactive, and to refrain from powering off the video display apparatus as long as the received status information indicates active even if the prescribed condition is satisfied.

2. The video display system of claim 1,
wherein the video display apparatus further includes a timer configured to count a time from when the video display apparatus is manipulated last time, and
wherein the prescribed condition is satisfied when the time counted by the timer reaches the second prescribed time.

3. The video display system of claim 1, wherein the second prescribed time being the same amount of time as the first prescribed time, wherein the second prescribed time is separate from the first prescribed time.

* * * * *